United States Patent
Shroff

(10) Patent No.: US 10,523,872 B2
(45) Date of Patent: Dec. 31, 2019

(54) METHODS AND APPARATUS FOR IMPLEMENTING ZOOM USING ONE OR MORE MOVEABLE CAMERA MODULES

(71) Applicant: LIGHT LABS INC., Redwood City, CA (US)

(72) Inventor: Sapna A Shroff, Sunnyvale, CA (US)

(73) Assignee: LIGHT LABS INC., Redwood City, CA (US)

(*) Notice: Subject to any disclaimer, the term of this patent is extended or adjusted under 35 U.S.C. 154(b) by 0 days.

(21) Appl. No.: 16/162,281

(22) Filed: Oct. 16, 2018

(65) Prior Publication Data

US 2019/0052813 A1 Feb. 14, 2019

Related U.S. Application Data

(63) Continuation of application No. 15/191,424, filed on Jun. 23, 2016, now Pat. No. 10,129,483.

(60) Provisional application No. 62/183,677, filed on Jun. 23, 2015.

(51) Int. Cl.

| | |
|---|---|
| *H04N 5/232* | (2006.01) |
| *H04N 5/247* | (2006.01) |
| *H04N 5/225* | (2006.01) |
| *G06T 11/60* | (2006.01) |
| *G02B 7/10* | (2006.01) |
| *H04N 5/265* | (2006.01) |
| *F16M 11/00* | (2006.01) |
| *G06T 1/00* | (2006.01) |

(52) U.S. Cl.
CPC ......... *H04N 5/23296* (2013.01); *F16M 11/00* (2013.01); *G02B 7/102* (2013.01); *G06T 1/0007* (2013.01); *G06T 11/60* (2013.01); *H04N 5/2258* (2013.01); *H04N 5/247* (2013.01); *H04N 5/265* (2013.01)

(58) Field of Classification Search
CPC .. H04N 5/23296; H04N 5/2258; H04N 5/247; H04N 5/265; F16M 11/00; G02B 7/102; G06T 11/60
See application file for complete search history.

(56) References Cited

U.S. PATENT DOCUMENTS

| | | | | |
|---|---|---|---|---|
| 2010/0097443 | A1* | 4/2010 | Lablans | ................ G03B 37/00 348/36 |
| 2012/0242788 | A1* | 9/2012 | Chuang | ............ G08B 13/19602 348/36 |

* cited by examiner

*Primary Examiner* — Twyler L Haskins
*Assistant Examiner* — Fayez Bhuiyan
(74) *Attorney, Agent, or Firm* — Straub & Straub; Michael P. Straub; Stephen T. Straub

(57) ABSTRACT

Methods and apparatus for implementing a camera device including multiple camera modules and which supports zoom operations are described. A plurality of moveable camera modules are included with the position of the moveable camera modules being controlled as a function of a zoom setting. One or more fixed camera modules are also included to facilitate image combining. A fixed camera module having a smaller focal length than the movable camera modules is used in some embodiments to capture a scene area including scene area portions which will be captured by movable camera modules. The image captured by the fixed camera module, with the small focal length, is used in aligning images captured by the movable camera modules during generation of a composite image. The camera may also include another fixed camera module, e.g., having the same focal length as the movable camera modules, for capturing the center of a scene.

15 Claims, 15 Drawing Sheets

METHODS AND APPARATUS FOR IMPLEMENTING ZOOM USING ONE OR MORE MOVEABLE CAMERA MODULES

RELATED APPLICATIONS

The present application is a continuation of U.S. application Ser. No. 15/191,424 filed Jun. 23, 2016 which claims the benefit of U.S. Provisional Patent Application Ser. No. 62/183,677 filed Jun. 23, 2015 with each one of the identified patent applications being hereby expressly incorporated by reference in its entirety.

FIELD

The present application relates to image capture and generation methods and apparatus and, more particularly, to methods and apparatus relating to a camera device which includes multiple optical chains and supports zoom operations.

BACKGROUND

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

While large lenses have many advantages with regard to the ability to capture relatively large amounts of light compared to smaller lenses, they can be used to support large zoom ranges, which may be implemented using optical or digital techniques, and often allow for good control over focus, there are many disadvantages to using large lenses.

Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time.

In order to overcome some of the disadvantages of cameras with large single lens assemblies, the use of multiple smaller camera modules in a single camera device may be used. The use of multiple small camera modules allow for more light to be captured than if a single small camera module was used with the image of different portions of a scene area captured by different modules potentially being combined to form an image of a scene area of interest. In order to support the capture of a relatively large scene area, the overlap of scene portions captured by a plurality of different camera modules may be small or non-existent. While this may be desirable to enable the capture of a large scene area, in the case of fixed camera modules and a high level of zoom, much of the scene area captured by many of the fixed camera modules may go unused as corresponding to scene areas outside the scene area of interest to be captured for a user selected zoom level, e.g., a high level of zoom.

It would be desirable if methods and/or apparatus could be developed which would use camera modules more effectively than devices with fixed camera modules. In particular, it would be desirable if methods and/or apparatus could be developed which would allow significant portions of images captured by different camera modules of a camera device to contribute to capturing a scene area of interest even as the zoom level is increased. While not necessary for all embodiments, it would be desirable if in at least some embodiments some or all of the camera modules of the camera device avoided the use of moveable mirrors which, while having some advantages for particular applications, can also lead to complexity in terms of camera module design and/or construction.

SUMMARY

In various embodiments a camera device includes multiple camera modules one or more of which is mounted in a moveable manner. In some embodiments the moveable camera modules or modules does not include a moveable mirror. In some implementations the moveable camera modules can be titled or rotated to change the camera module's field of view while the camera device remains stationary.

In some embodiments, one or more of the moveable camera modules is moved to alter its field of view based on a zoom setting. In such embodiments, multiple camera modules may be moved as a function of the zoom setting. As the zoom level increases, and the size of the scene area of interest thus decreased, multiple camera modules may be moved so that there is an increase in the overlap of the scene area portions captured by different camera modules. This allows large portions of images captured by various camera modules to contribute to the image being produced which might not be the case if the camera modules were not moved. Thus, by moving some of the camera modules the portion of the scene area of interest which is captured by the camera modules that is useful can remain significant even at relatively high zoom settings.

In some embodiments the camera device includes a plurality of camera modules having different focal lengths. The focal lengths may be fixed with the device including one or more modules having a first focal length and one or more modules having a second focal length. In some embodiments one or more camera modules with a third or other focal length are also included. In some embodiments the first focal length (f1) is smaller than the second focal length (f2) which is smaller than the third focal length (f3). The smallest focal length (f1) camera modules will capture the largest scene area while the second and third focal length camera modules will capture small scene areas but at a higher resolution assuming the camera modules uses sensors of the same resolution which is the case in some but not necessarily all embodiments.

In one embodiment as the zoom level is increased, one or more camera modules with a larger focal length than another camera module is moved to alter the field of view captured by the camera module. Thus, as zoom is increased and the size of the scene area of interest is increased, some of the larger focal length camera modules are moved, e.g., titled or rotated, so that the a large portion or all of the scene area captured by the larger focal length camera module will continue to correspond to the scene area of interest despite the decreasing size of the scene area of interest due to the increased zoom. In some embodiments, this involves moving at least some of the camera modules so that the amount of overlap of the scene area captured by the camera modules, even though the focal length of the camera modules remains unchanged as the zoom setting selected by a user increases the zoom level. In some embodiments at least one fixed camera module may remain directed to the center portion of a scene area as the user changes zoom settings with one or more other camera modules being moved, as zoom level is increased, so that they capture an ever increasing amount of area which is also captured by the fixed camera module.

Thus, in various embodiments, the position of a camera module is controlled as a function of zoom. As the zoom setting is increased one more moveable camera module is moved to change its field of view. In at least one embodiment a camera device implementing the invention includes at least 4 moveable cameras modules whose position is controlled by a control device based on the zoom setting. The camera device also includes one or more fixed camera modules which do not move as a function of zoom setting. Images captured by the moveable camera modules are combined to generate an image corresponding to the user selected zoom setting. The images captured by the moveable camera modules are optionally combined with the image captured by one or more fixed camera modules. As the overlap in the image area captured by the camera modules increases with increasing zoom, the amount of light which can be captured in a given time for the scene area is increased thereby allowing shorter exposure times and/or increased averaging of pixel values which can provide a better image, e.g., as the effect of random noise is decreased.

While many embodiments and features have been discussed in the above summary, it should be appreciated that many of the novel features described herein can be used independent of other novel features. Thus while various exemplary embodiments have been described, the application is not limited to the particular exemplary embodiments or combinations of features described in particular exemplary embodiments.

Numerous additional features and embodiments are described in the detailed description which follows.

BRIEF DESCRIPTION OF THE FIGURES

FIG. 14 comprises the combination of FIG. 14A, FIG. 14B and FIG. 14C.

DETAILED DESCRIPTION

Figure 1:
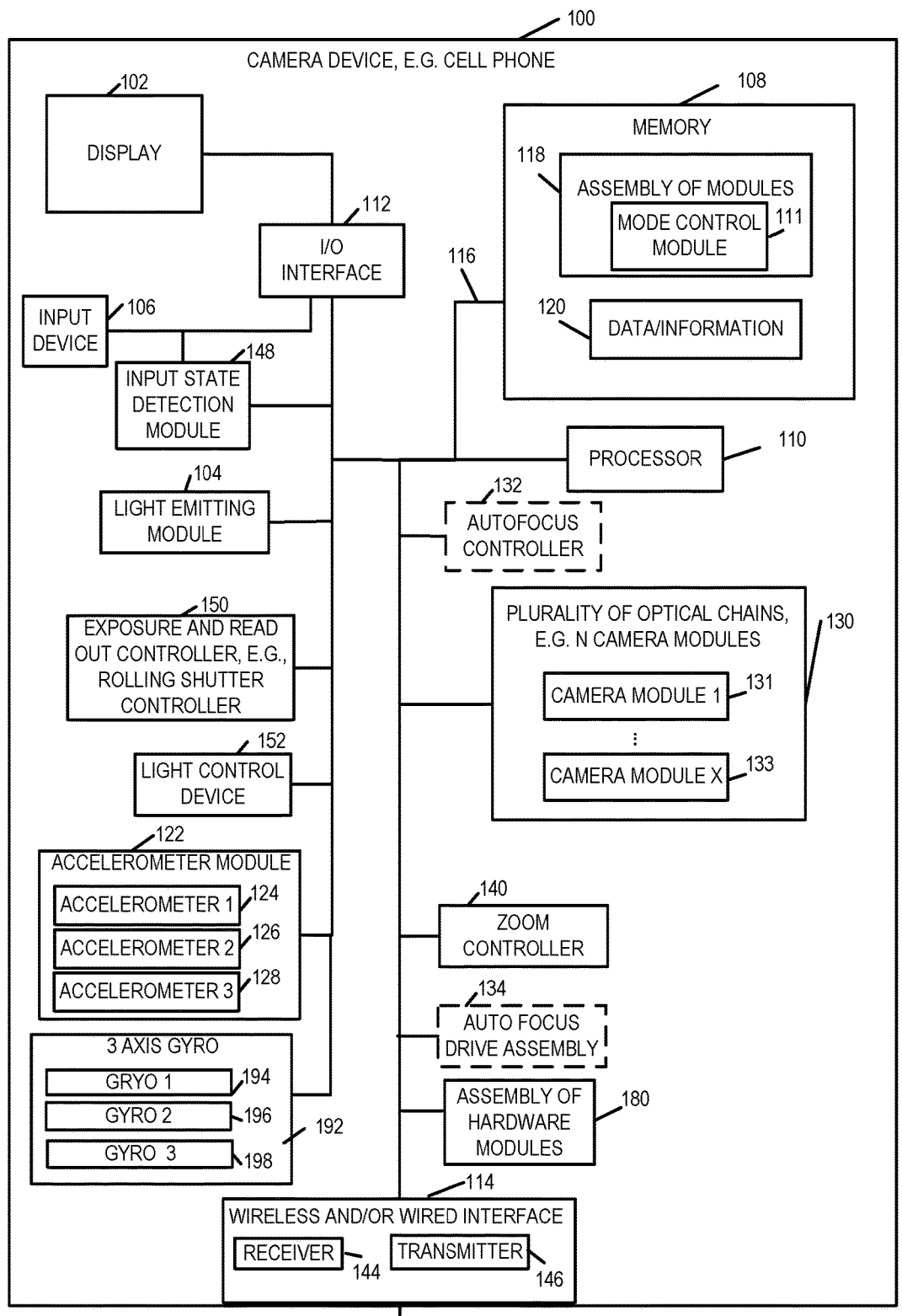
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which may be LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes gyro 1 194, gyro 2 196 and gyro 3 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140, to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in an un-depressed state the camera zoom function is disabled. The input state detection module 148 is configured to detect the state of the input device, e.g., the zoom control button, to detect whether the button is in a depressed state or un-depressed state. In some embodiments there is a status register in the camera device 100 that includes a bit indicating the state of the zoom control button detected by the state detection module 148, e.g., whether it is in the depressed state indicating that zoom is enabled or whether it is un-depressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 8:
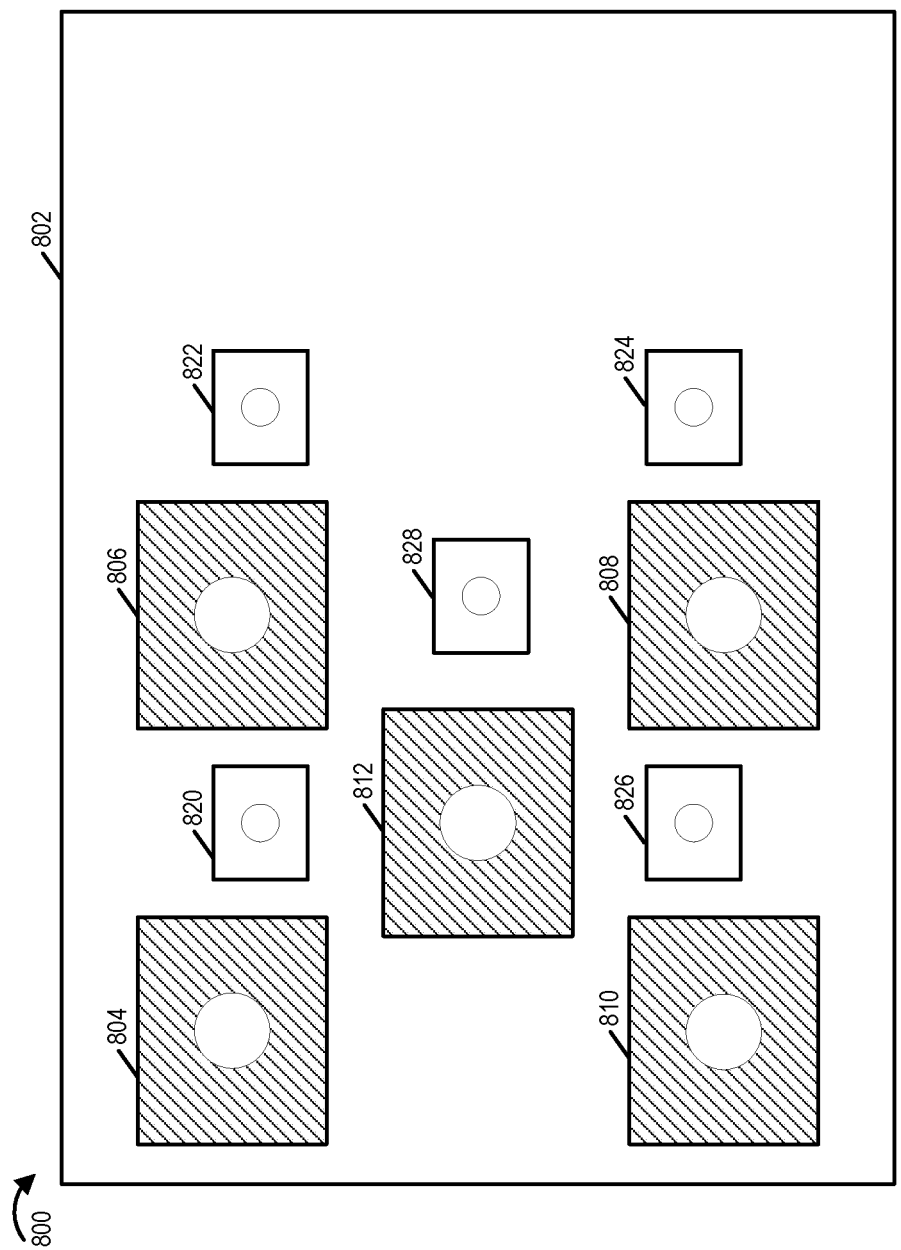
FIG. 8 illustrates an exemplary layout and placement arrangement of exemplary camera modules in a camera device in accordance with one embodiment.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 8 while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, . . . , 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, gyro 1 194, gyro 2 196 and gyro 3 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor 110 may be a dedicated processor that is preconfigured to implement the methods of the present invention. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture, image generation and/or image data processing methods of the present invention. Individual steps and/or lines of code in the modules of 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. The assembly of modules 118 includes a mode control module 111 which determines, e.g., based on user input which of a plurality of camera device modes of operation are to be implemented. In different modes of operation, different camera modules (131, . . . 133) may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor 110 when executing the instructions from one or more assembly of modules is instead performed by a hardware module which performs the same functionality and is included in the hardware assembly of modules 180.

The resulting data and information (e.g., captured images of a scene, combined or composite images of a scene, filtered images etc.) are stored in data/information block 120 for future use, additional processing, and/or output, e.g., to display device 102 for display or to another device for transmission, processing and/or display. In some embodiments the data/information block 120 further includes optical chain information, e.g., optical characteristics, corresponding to the plurality of optical chains 130 in the device 100. If one or more parameters/settings in the optical characteristics of a camera module changes then the corresponding optical chain information stored in the data/information 120 is updated. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
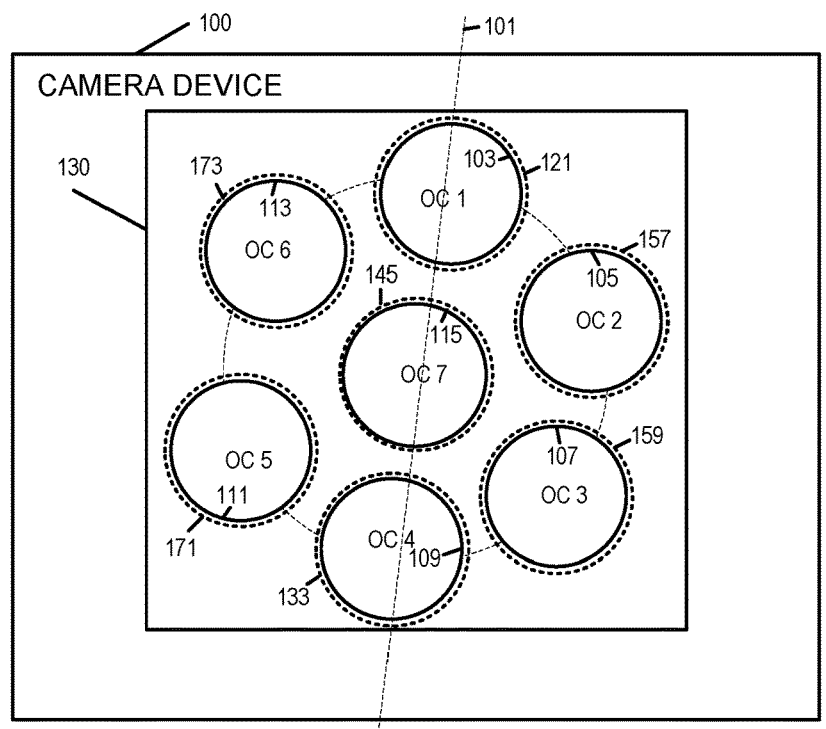
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
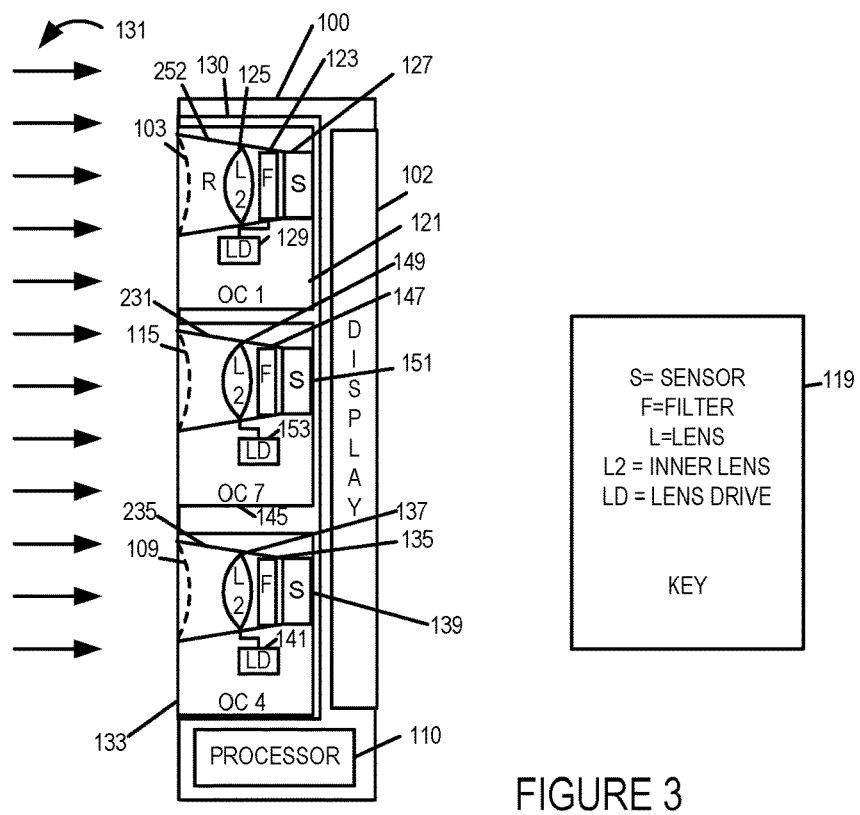
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, an inner lens L2 125, a filter 123 and a sensor 127. In some embodiments the OC 1 121 further includes lens drive (LD) 129 for controlling the position of lens L2 125 for zooming and/or auto focus operation purposes. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. While not shown in FIG. 3 example, a module drive (MD) is used for controlling the positioning of the camera module to capture a desired area or portion of a scene of interest. In some embodiments the module drives (MD) are used for controlling the positioning of respective camera modules as a function of a zoom setting. The MD includes a motor or other drive mechanism which can control the rotation of the camera module.

OC 7 145 includes an outer opening 115, an inner lens L2 149, a filter 147, and a sensor 151. OC 7 145 further includes LD 153 for controlling the position of lens L2 149. The LD 153 includes a motor or other drive mechanism which can move the lens, barrel, cylinder, sensor or other optical chain element to which it is connected.

OC 4 133 includes an outer opening 109, an inner lens L2 137, a filter 135 and a sensor 139. OC 4 133 includes LD 141 for controlling the position of lens L2 137. The LD 153, 141 include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or sensors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

While seven optical chains are shown in FIG. 2, it should be appreciated that other numbers of optical chains are possible. For example in some embodiments seventeen camera modules are used in a single camera device wherein at least some of the camera modules are moveable. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a compact device with a flat or nearly flat front area.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

The camera device 100 shown in FIG. 3 supports a relatively large light capture area and offering a large amount of flexibility in terms of color filtering and exposure time.

Figure 4:
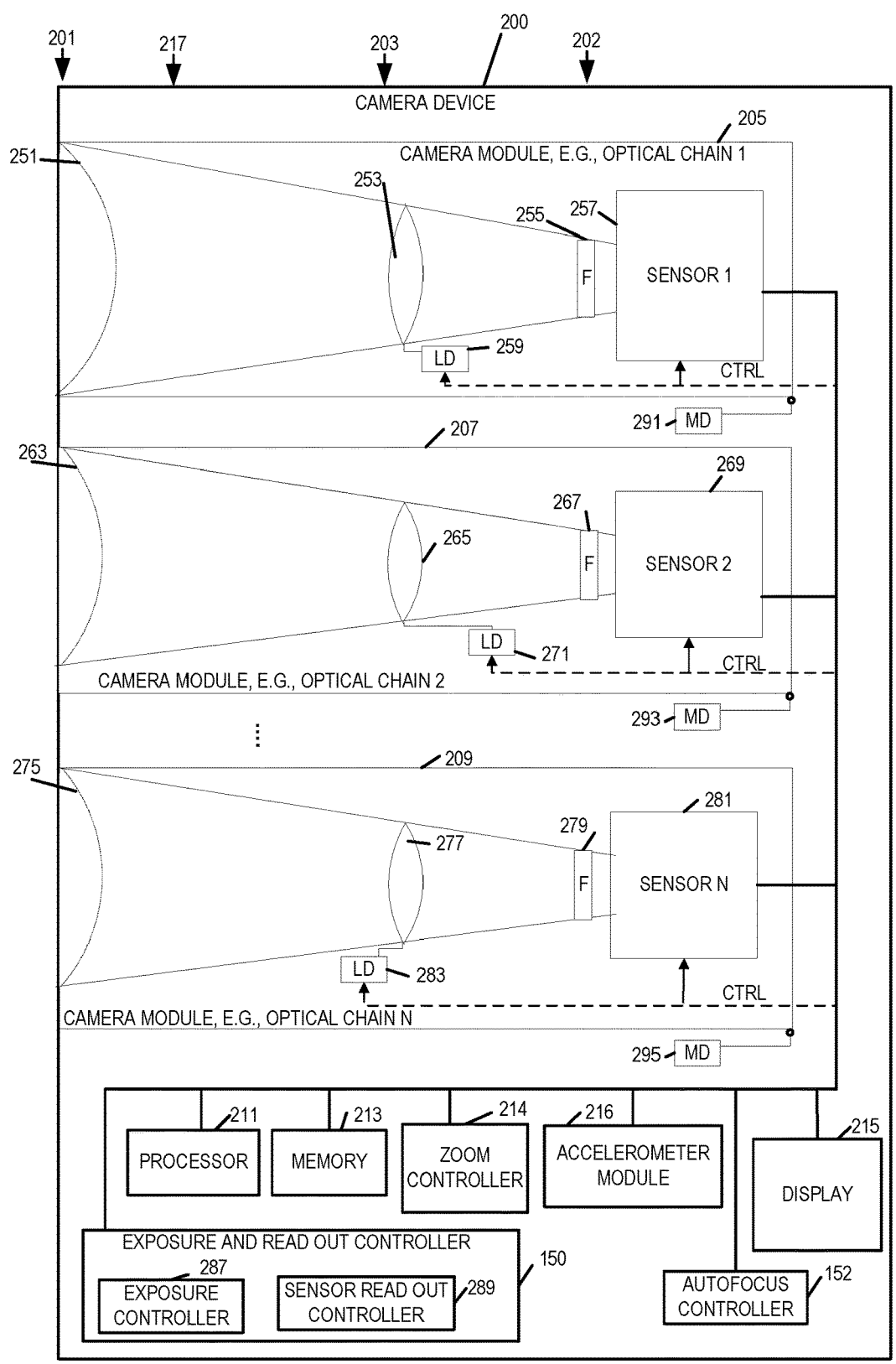
FIG. 4 illustrates a camera device implemented in accordance with another embodiment.

FIG. 4 illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC N 209, a processor 211, memory 213 and a display 215, coupled together. OC 1 205 includes outer opening 251, an inner lens L2 253, a filter 255, sensor 1 257, and lens drive LD 259. A module drive (MD) 291 is sometimes used to control movement/rotation of camera module 205 around an axis of rotation and thus change the scene area to which the camera module 205 is directed. Moving (e.g., rotating about a hinge) the camera module 205 to change the scene area to which the module 205 is directed is especially useful in many embodiments, more so in cases where the rotation is controlled as a function of a zoom setting to focus on a scene area where the user wants to zoom in.

The optical chains shown in FIG. 4 can be arranged in various positions within the camera 200. In some but not all embodiments, processor 211 of camera device 200 of FIG. 4 is the same as or similar to processor 110 of device 100 of FIG. 1, memory 213 of device 200 of FIG. 4 is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4 is the same as or similar to the display 102 of device 100 of FIG. 1.

OC 2 207 includes outer opening 263, inner lens 265, filter 267, sensor 2 269, and LD 271. OC N 209 includes outer opening 275, inner lens 277, filter 279, sensor N 281, and LD 283. The module drives MD 293 and MD 295 are used to control movement/rotation of camera modules 207, 209 around respective axis of rotations and thus change the scene area to which these individual camera modules 207, 209 are directed at. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4 embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4, the structural relationship between the various lenses and filters which precede the sensor in each optical chain can be seen more clearly than in some of the other figures. While three elements, e.g. an opening, lens (see columns 201 and 203), and the filter (corresponding to column 202) are shown in FIG. 4 before each sensor, it should be appreciated that a much larger combinations (e.g., numbers) of lenses, and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains.

In some but not all embodiments, optical chains are mounted in the camera device with some, e.g., the shorter focal length optical chains extending in a straight manner from the front of the camera device towards the back. A camera may have a wide variety of different camera modules. Filters and/or lenses corresponding to different optical chains may, and in some embodiments are, arranged in planes, e.g., the outermost openings may be configured in a plane that extends parallel to the face of the camera, e.g., a plane in which the front of the camera both extends vertically and horizontally when the camera is in a vertical direction with the top of the camera both being up.

Figure 5:
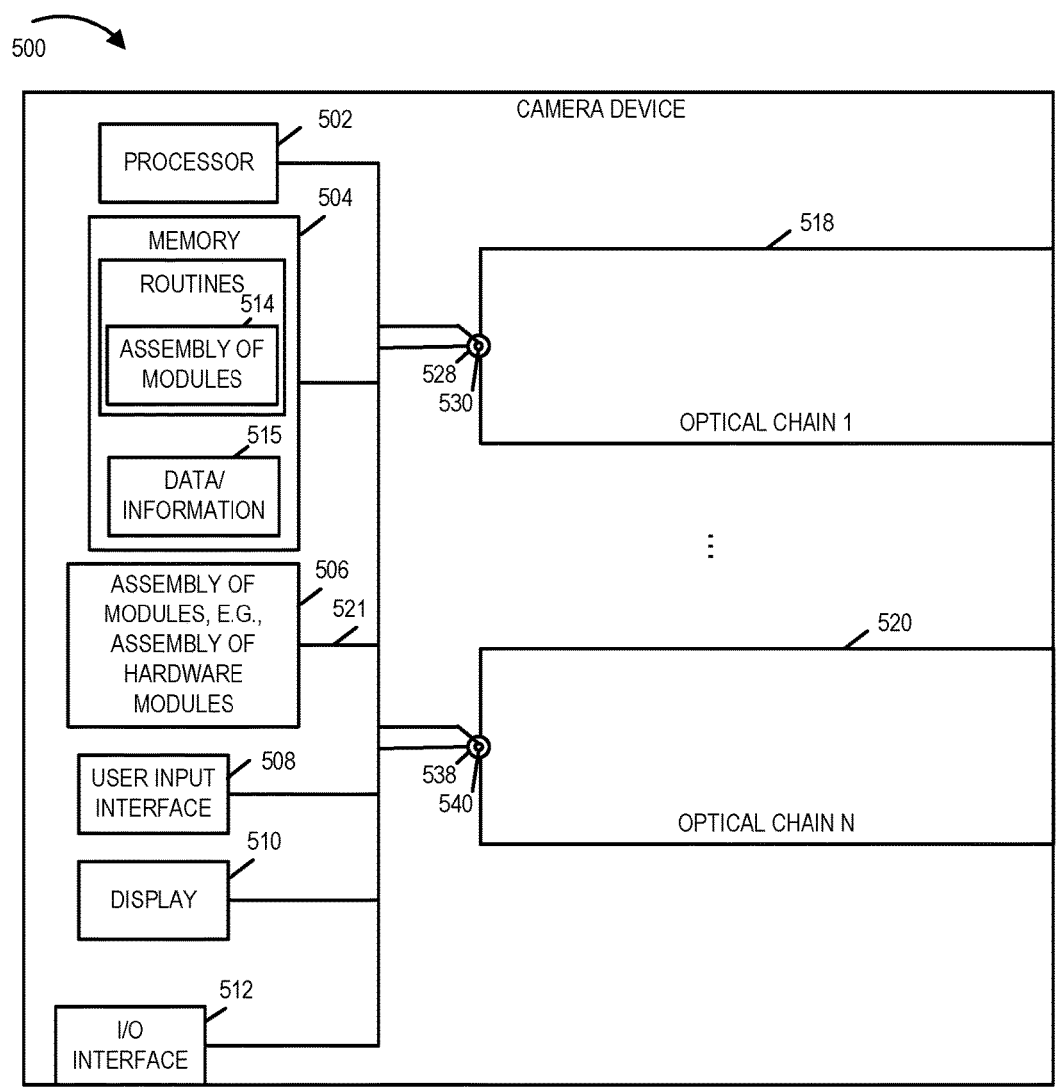
FIG. 5 is a drawing of an exemplary camera device including moveable, e.g., rotatable, optical chains in accordance with an exemplary embodiment.

FIG. 5 is a drawing of an exemplary camera device 500 including moveable, e.g., rotatable, optical chains in accordance with an exemplary embodiment. Camera device 500 includes a processor 502, e.g., a CPU, memory 504, an assembly of modules 506, e.g., an assembly of hardware modules such as circuits, a user input interface 508, a display 510, an I/O interface 512, and a plurality of optical chains (optical chain 1 518, . . . , optical chain N 520) coupled together via a bus 521 over which the various elements may interchange data and information. FIG. 5 example shows on exemplary arrangement that can be used to couple the optical chains (518, . . . , 520) to respective rotation control drives (528, . . . , 530)_which control movement/rotation of the optical chains in accordance with the features of the invention.

Display 510, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera device 500. User input interface 508 includes, e.g., switches, buttons, touch screen interface, etc., for receiving input from the user. I/O interface 512 includes a plurality of communications ports for communicating with other devices, e.g., a personal computer. I/O interface 512 in some embodiments, includes one or more wireless communications interfaces. Information communicated over I/O interface 512 includes, e.g., a combined images generated from captured images from multiple optical chains, and/or captured images from individual optical chains to be processed and/or combined externally, e.g., in a personal computer. Memory 504 includes assembly of modules 514 and data/ information 516.

Optical chains 1 through N 518, 520 are moveable, e.g., rotatable, camera modules which are similar to the optical chains discussed above with regard to FIGS. 3 and 4 and include the same or similar components, e.g., an outer opening, a lens assembly including one or more lenses, and an image sensor. The optical chain 518 is coupled to a rotation module 528, e.g., a drive motor and corresponding drive circuitry, and a optical chain position detection module 530, e.g., an angular position sensing device such as a resolver or synchro or optical rotary encoder or a magnetic rotary encoder, and, in some embodiments, circuitry to convert the sensor measurement into a digital value, e.g., an analog to digital converter. Similarly the optical chain 520 is coupled to a rotation module 538, e.g., a drive motor and corresponding drive circuitry, and an optical chain position detection module 540, e.g., an angular position sensing device. The rotation modules 528 and 530 perform the same or similar function as discussed with regard to the module drives (MD) 291, 293, 295 above, e.g., to control movement/ rotation of optical chains 518, 520 respectively to direct these optical chains at a desired scene area or portion of scene area to be captured. In some embodiments the rotation of the camera module is controlled as a function of a zoom setting. One or more of the optical chain modules (518, . . . , 520) in some embodiments, include one or more additional elements, e.g., an additional lens, a filter, etc.

Figure 6:
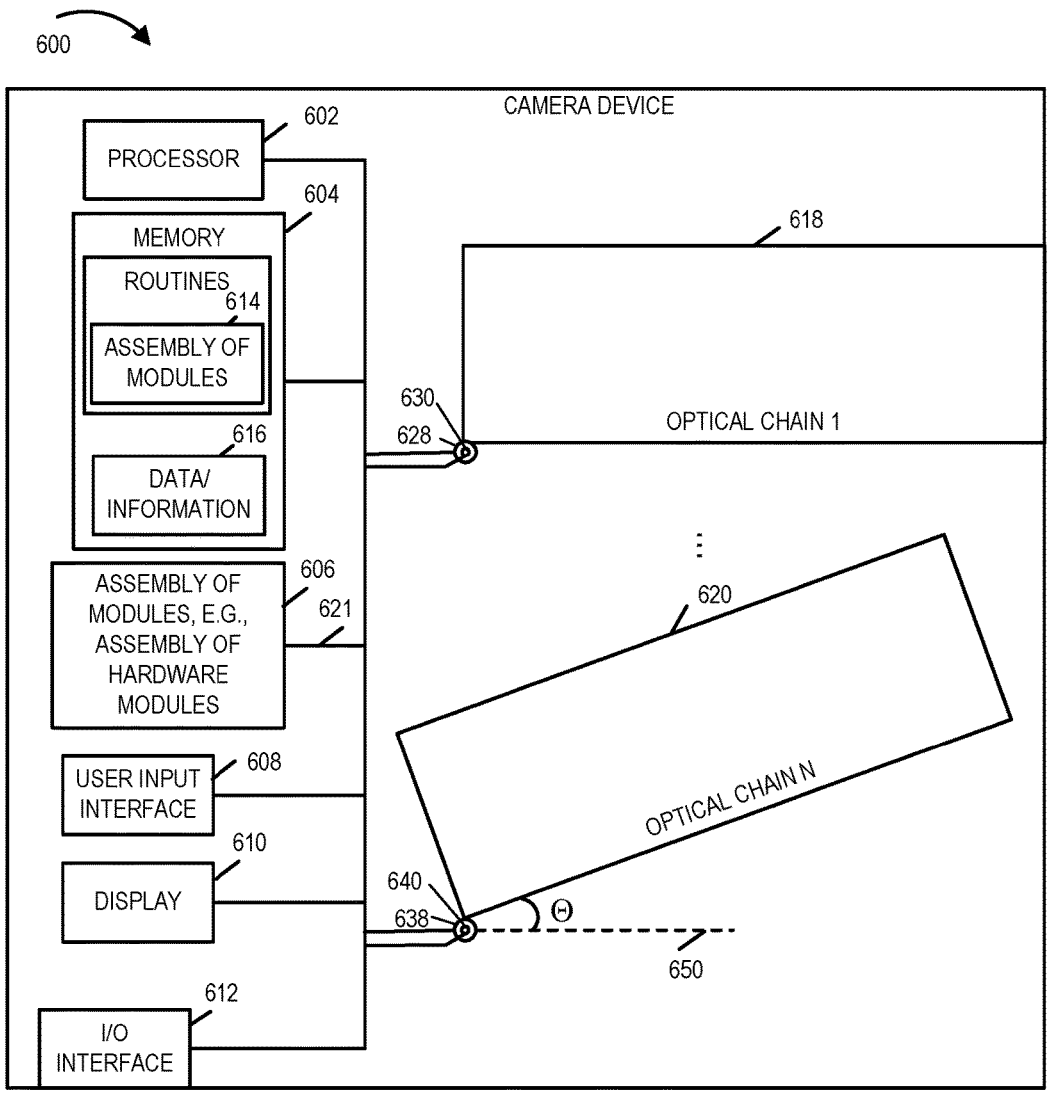
FIG. 6 is a drawing of an exemplary camera device including moveable, e.g., rotatable, optical chains in accordance with another exemplary embodiment.

FIG. 6 is a drawing of an exemplary camera device 600 including moveable, e.g., rotatable, optical chains in accordance with an exemplary embodiment. Camera device 600 includes a processor 602, e.g., a CPU, memory 604, an assembly of modules 606, e.g., an assembly of hardware modules such as circuits, a user input interface 608, a display 610, an I/O interface 612, and a plurality of optical chains (optical chain 1 618, . . . , optical chain N 620) coupled together via a bus 621 over which the various elements may interchange data and information. The FIG. 6 example shows another exemplary arrangement that can be used to couple the optical chains of the camera to respective rotation control drives which control movement/rotation of the optical chains in accordance with the features of the invention.

Display 610, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera device 600. User input interface 608 includes, e.g., switches, buttons, touch screen interface, etc., for receiving input from the user. I/O interface 612 includes a plurality of communications ports for communicating with other devices, e.g., a personal computer. I/O interface 612, in some embodiments, includes one or more wireless communications interfaces. Information communicated over I/O interface 612 includes, e.g., a combined images generated from captured images from multiple optical chains, and/or captured images from individual optical chains to be processed and/or combined externally, e.g., in a personal computer. Memory 604 includes assembly of modules 614 and data/information 616.

Optical chains 1 through N 618, 620 are moveable, e.g., rotatable, camera modules which are similar to the optical chains discussed above with regard to FIGS. 3 and 4 and include the same or similar components, e.g., an outer opening, a lens assembly including one or more lenses, and an image sensor. The optical chain 618 is coupled to a rotation module 628, e.g., a drive motor and corresponding drive circuitry, and a optical chains position detection module 630, e.g., a angular position sensing device such as a resolver or synchro or optical rotary encoder or a magnetic rotary encoder, and, in some embodiments, circuitry to convert the sensor measurement into a digital value, e.g., an analog to digital converter. Similarly the optical chain 620 is coupled to a rotation module 638, e.g., a drive motor and corresponding drive circuitry, and an optical chain position detection module 640, e.g., an angular position sensing device. The rotation modules 628 and 630 perform the same or similar function as discussed with regard to the module drives (MD) 291, 293, 295 above, e.g., to control movement/ rotation of optical chains 618, 620 respectively to direct these optical chains at a desired scene area or portion of scene area. In some embodiments the rotation of the camera module is controlled as a function of a zoom setting. It can appreciated from the figure that in the example of FIG. 6, while optical chain 1 618 is shown to be in the non-rotated nominal position, the optical chain 620 is shown in a rotated position having an angle relative to the reference line 650.

The camera module drive (MD) 291, 293, 295 and/or the rotation control module such as module 628, 638 may be used to change the position of a corresponding camera module to which it is coupled to alter the pointing direction of the module. Thus, the direction in which an optical chain effectively points may be altered by controlling the movement/rotation of the optical chain via the module drive and/or rotation control module. The module drive may be implemented using a motor or other mechanical mechanisms, which can be used to position an optical chain to point at different areas of interest in a scene area by controlling the angle of rotation.

Figure 7:
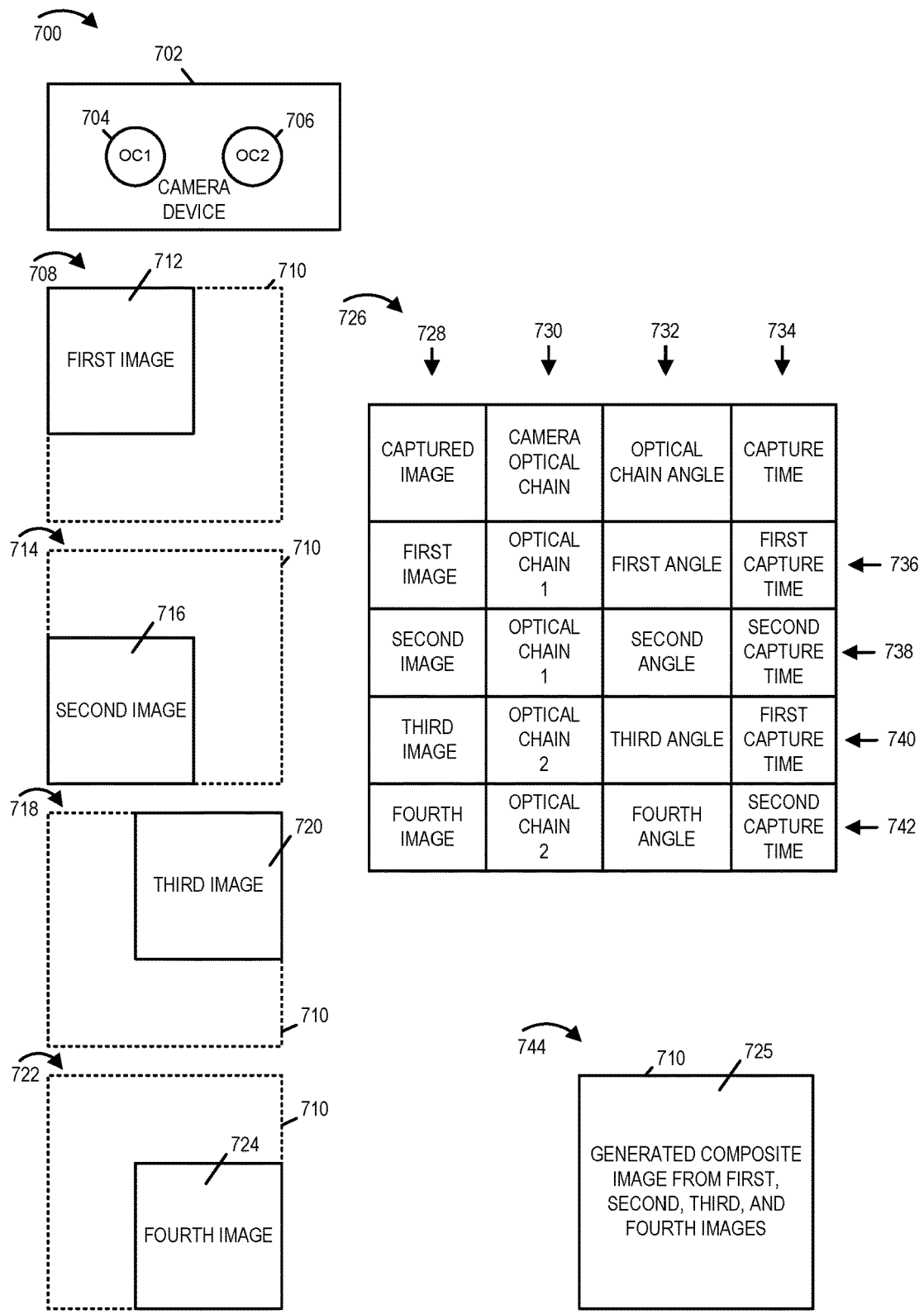
FIG. 7 is a drawing used to illustrate exemplary captured images used to generate a combined image in accordance with an exemplary embodiment.

FIG. 7 is a drawing 700 used to illustrate exemplary captured images used to generate a combined image in accordance with an exemplary embodiment. Drawing 700 includes an exemplary camera device 702 including two optical chains, e.g., moveable camera modules, in accordance with an exemplary embodiment. Camera device 702 is, e.g., camera device 500 of FIG. 5 or camera device 600 of FIG. 6. Each of the moveable optical chains of camera device 702 is the same or similar to the optical chains discussed with regard to FIGS. 3-4 and/or or FIGS. 5-6, and in some embodiments includes and an outer opening, one or more lenses, and an image sensor.

Drawing 708 of FIG. 7 illustrates a first captured image 712 within a scene of interest 710. Drawing 714 of FIG. 7 illustrates a second captured image 716 within the scene of interest 710. Drawing 718 of FIG. 7 illustrates a third captured image 720 within the scene of interest 710. Drawing 722 of FIG. 7 illustrates a fourth captured image 724 within the scene of interest 710. Note that each of the images (first image 712, second image 716, third image 720, fourth image 724) includes a non-overlapping image portion with respect to the other images. Drawing 744 illustrates a composite image 725, corresponding to the scene area of interest 710, which is generated from the captured images (first image 712, second image 716, third image 720 and fourth image 724).

Table 726 illustrates which optical chains are used to capture which images, exemplary optical chain angle settings used for image capture, and exemplary capture times corresponding to the captured images. First column 728 identifies the captured image. Second column 730 identifies the optical chain used to capture the identified image in the same row of the first column. Third column 732 identifies an exemplary angle setting to which the optical chain capturing the image was set at the time of image capture. Fourth column 734 identifies an exemplary capture time during which the corresponding image of the same row was captured.

Row 736 identifies that first image 712 was captured by optical chain 1 704; the optical chain 1 was set at a first angle when the first image was captured; and the first image was captured during a first capture time interval. Row 738 identifies that second image 716 was captured by optical chain 1 704; the optical chain 1 was set at a second angle when the second image was captured; and the second image was captured during a second capture time interval. Row 740 identifies that third image 720 was captured by optical chain 2 706; the optical chain 2 was set at a third angle when the third image was captured; and the third image was captured during a first capture time interval. Row 742 identifies that fourth image 724 was captured by optical chain 2 706; the optical chain 2 was set at a fourth angle when the fourth image was captured; and the fourth image was captured during a second capture time interval.

In one exemplary embodiment, the second angle is greater than the first angle, and the fourth angle is greater than the third angle. In some such embodiments, the first angle is substantially the same as the third angle, and the second angle is substantially the same as the fourth angle. In various embodiments, the first capture time is the same duration as the second capture time. In some embodiments, the first optical chain and the second optical chain are moved in parallel during a time interval between first capture time and the second capture time, e.g., to facilitate a small time gap between the first capture time and second capture time. In some other embodiments, the first optical chain and the second optical chain are moved, e.g., rotated, serially during a time interval between first capture time and the second capture time, e.g., to limit instantaneous battery power drain.

While the camera modules may be moved and used to capture different images at different times which can be combined, in some embodiments more than two movable camera modules are operated in parallel and composite images are generated from a set of images captured at the same time period rather than sequential non-overlapping image capture time periods.

FIG. 8 is a front view 800 of a camera 802 including a plurality of camera modules of different sizes. The FIG. 8 embodiments shows a camera device 802 with 10 optical chains which are referred to herein as camera modules. The camera modules may be implemented using the camera modules of any of the other figures and, depending on the embodiment may be fixed or movable. While camera modules with two different focal lengths are shown, in some embodiments camera modules of a third focal length, e.g., a focal length larger than that of the camera modules shown in FIG. 8 is also included in the camera device. In the FIG. 8 embodiment the larger camera modules 804, 810, 806, 808, 812 are camera modules with digital sensors with a first focal length, e.g., a focal length equivalent to a 70 mm focal length of a film camera. The smaller camera modules 820, 822, 828, 826 and 824 are camera modules with a second focal length that is smaller than the first focal length, e.g. a focal length equivalent to a 35 mm focal length of a film camera. The 35 mm equivalent camera modules will capture a scene area approximately 4 times the size of the 70 mm focal length camera modules. In some embodiments all of the camera modules do not include mirrors and the sensor of the camera module is located at the rear of the camera module with the aperture through which light enters the camera module being located at the front of the camera module. In some embodiments the camera modules 812, 828 which captures a center portion of a scene area is a fixed non-movable module while the other camera modules 804, 806, 810, 808 and 820, 822, 826, 824 being movable with the position, e.g., angle or direction front to back, being controlled based on a user zoom setting. In one embodiment, as a user increases the zoom setting, the camera modules used to capture outer portions of the scene area are moved so that the scene area being captured is closer to the center of the scene area captured by the fixed camera module 812 and/or 828. Thus, as the zoom level increases the amount of overlap in images captured by the camera modules 804, 806, 810, 808 will increase. Similarly, the overlap of images captured by modules 820, 822, 826, 824 will increase as a function of an increase in a zoom setting and decrease as the user lowers the zoom setting. Camera module 828 may, and in some embodiments does, capture an image corresponding to the scene area captured by the combination of modules 804, 806, 810, 808. The image captured by camera module 828 which has a smaller focal length than camera modules 804, 806, 810, 808 and 812 can be used to align the images captured by the camera modules 804, 806, 810, 808, 812 with the larger focal length.

Figure 9:
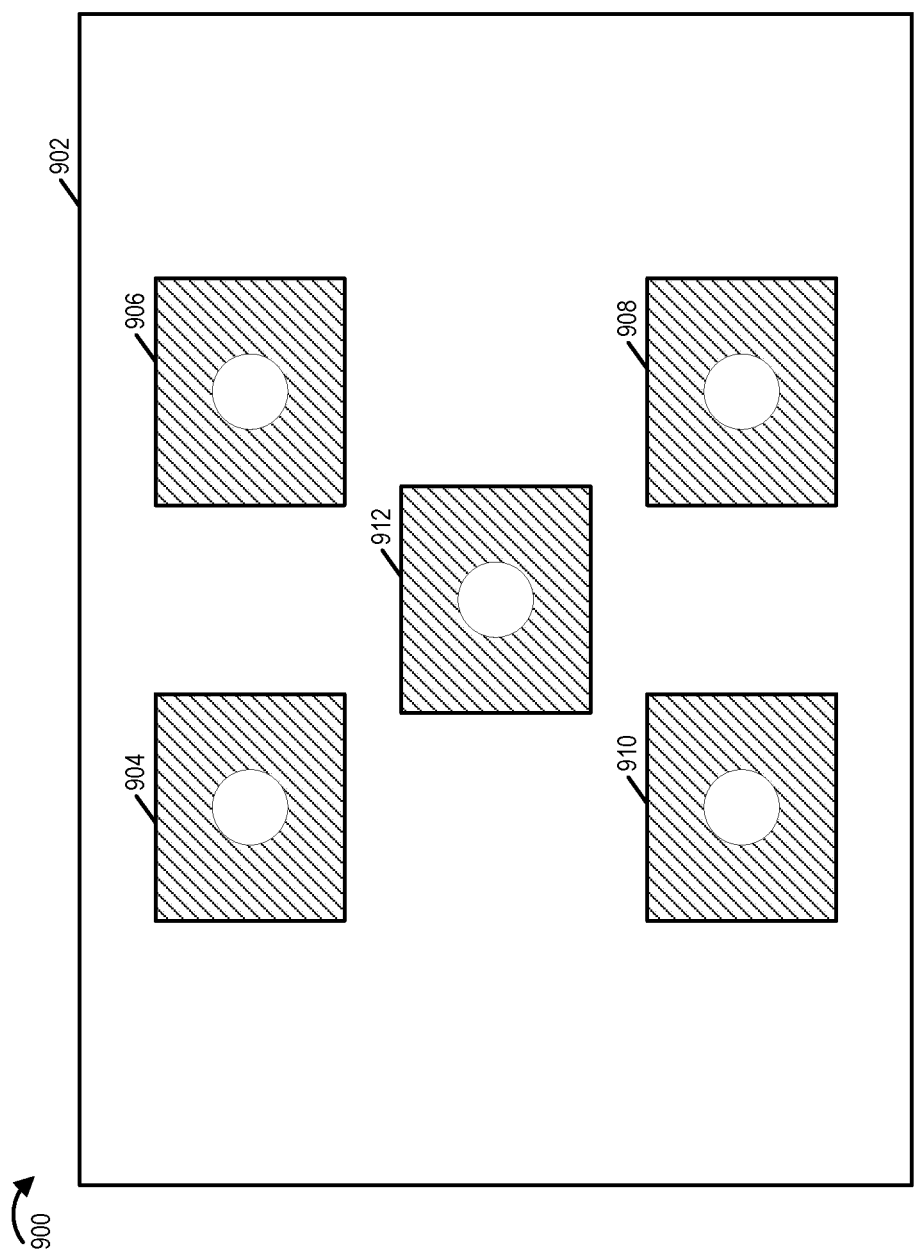
FIG. 9 illustrates another exemplary layout and placement arrangement of exemplary camera modules in a camera device in accordance with yet another exemplary embodiment.

FIG. 9 is an illustration of a camera device 902 which includes five camera modules 904, 906, 912, 910, 908 having the same focal length. The camera modules may be fixed focal length cameras which do not support optical zoom operations via moving a lens out or in. All or at least some of the camera modules shown in FIG. 9 are moveable and can be angled or rotated to capture a different field of view than if the camera module remains directed straight ahead. In some embodiments the camera modules can move less than 25 degrees in left, right and/or up and down. The position of the camera modules aperture need not change as long as the aperture is wide enough to support the various supported viewing angles and the front glass covering the front of the camera and the apertures corresponding to the camera modules can remain flat and need not move as the camera modules inside the camera 902 are moved. Similarly in the FIG. 8 embodiment the front of the camera can remain flat and need not move as one or more camera modules are moved as a function of a user's zoom setting. Thus the camera modules of FIG. 9 and the other figures may have a generally fixed length.

The embodiment shown in FIG. 9 includes four camera modules which each capture approximately ¼ of a field of view corresponding to a minimum zoom setting with the center camera module 912 capturing a similarly sized portion of the image area but with the image captured by module 912 being located at the center of the scene area being captured and overlapping portions of the scene area captured by modules 904, 906, 908 and 910. The images captured by the camera modules may be, and in some embodiment are, combined to generate a composite image corresponding to the user selected zoom level.

Figure 10:
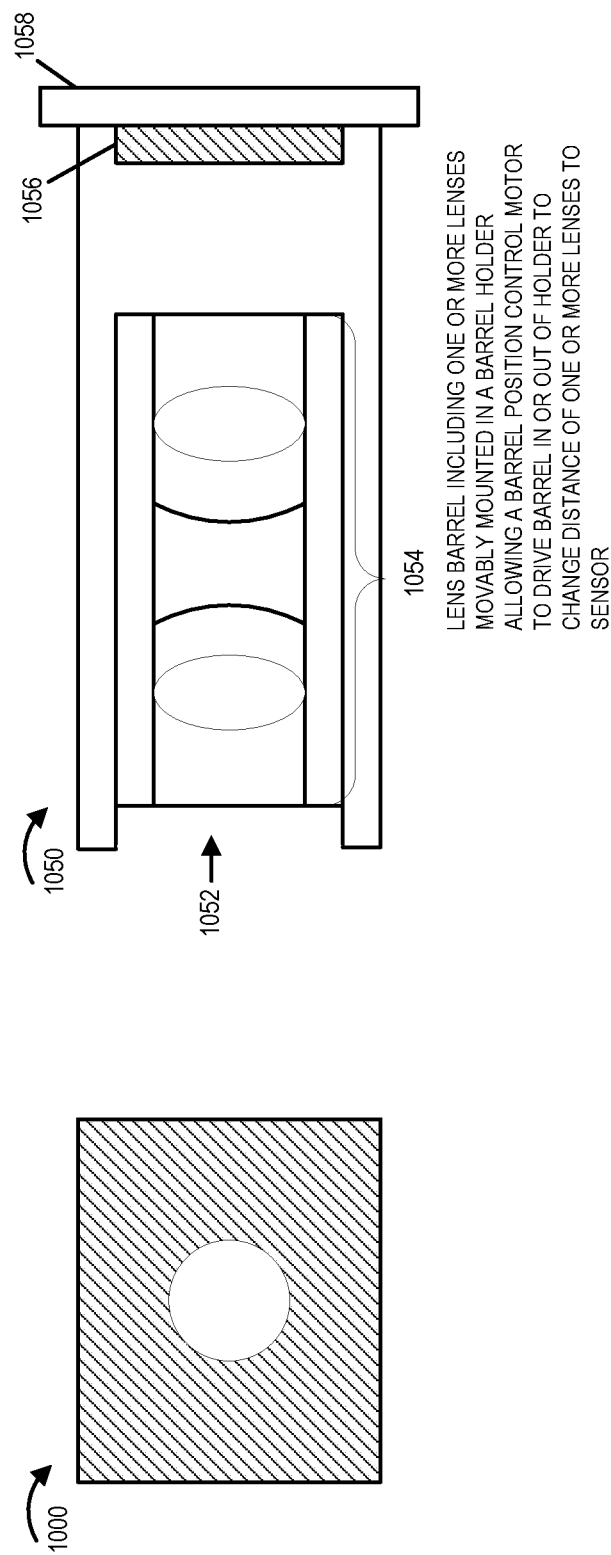
FIG. 10 includes two drawings illustrating an exemplary optical chain, e.g., camera module, implemented in accordance with one embodiments and which is used in an exemplary camera device in some embodiments.

FIG. 10 illustrates a front view 1000 of a camera module along with a side view 1050 of the same camera module. Light enters the front 1052 of a lens barrel 1054 and passes through one or more lenses to reach the sensor 1056. The lens barrel 1054 and one or more lenses mounted therein may be moved as part of a focus operation. The rear portion 1058 of the camera module 1050 may be, and in some embodiments is, a printed circuit board though which electrical signals communicating the images captured by the sensor 1056 are output, e.g., to the processor of the camera device which includes the camera module 1050. The side of the camera module and/or the circuit board 1058 are rigid and a motor or other drive mechanism can be mounted to these elements. In addition a pivot, hinge or rotatable support can be secured to the side of the camera module or rear of the camera module to hold the camera module in a moveable configuration where the motor or drive can then control the position of the camera module as a function of the user's zoom setting.

Figure 11B:
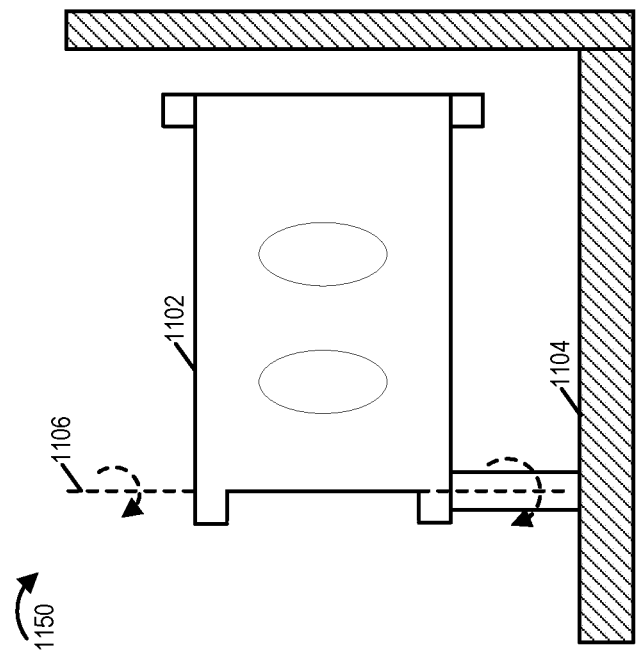
FIG. 11B illustrates another exemplary arrangement of the exemplary moveable camera module on a rotation mount in accordance with one exemplary embodiment.
Figure 11A:
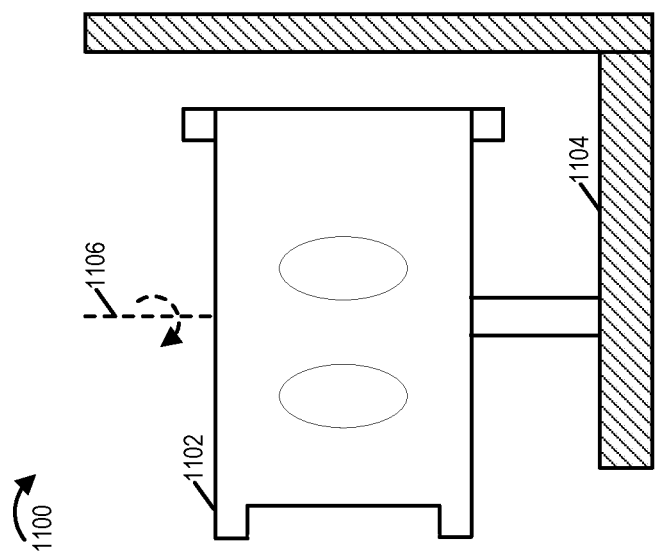
FIG. 11A illustrates an exemplary arrangement of an exemplary moveable camera module that can rotate around an axis of rotation in accordance with one exemplary embodiment.

FIG. 11A is a diagram 1100 showing a camera module 1102 mounted on a movable pivot which is secured to a support surface 1104. The camera module 1102 can be rotated around the axis 1106 by rotating the movable pivot which can be implemented as a support rod that is attached to a drive motor.

FIG. 11B is a diagram 1150 showing a camera module 1102 mounted on a movable pivot which is secured to the support surface 1104 and to the front side or bottom portion of the camera module 1102. The camera module 1102 can be rotated around the axis 1106 by rotating the movable pivot which can be implemented as a support rod that is attached to a drive motor.

Figure 12:
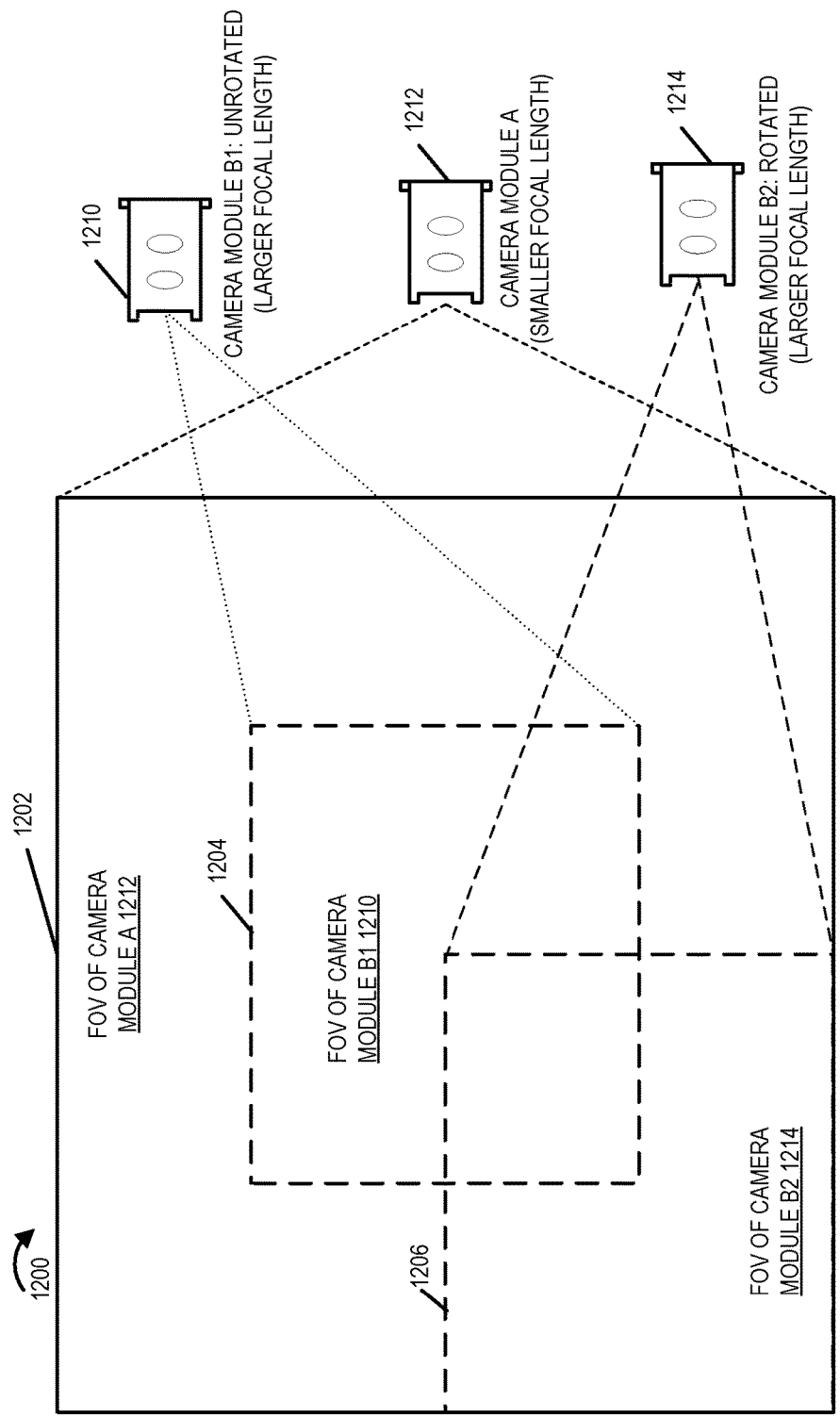
FIG. 12 is an example illustrating field of views corresponding to various exemplary camera modules that may be used in a camera device implemented in accordance with some embodiments.

FIG. 12 shows the field of view (1204, 1202, 1206) of three exemplary camera modules (camera module B1 1210, camera module A 1212, camera module B2 1214), respectively. Camera modules 1210, 1214 correspond to a second focal length which is longer than the focal length of camera module 1212. Because camera module 1212 has a shorter focal length it captures a larger area, e.g., an area approximately 4 times the size of the area captured by camera modules 1210, 1214. Camera modules 1210, 1214 may be camera modules 812, 810 of the camera device shown in FIG. 8 with camera module 1212 being the camera module 828 in one such embodiment. Note that the image captured by camera module 1212 can be used to facilitate combining of the images captured by camera modules 1214, 1210 since the module 1212 covers the portion of the scene including the portions captured by the other camera modules (1210, 1214). While not shown in the FIG. 12 example additional camera modules having the same focal length as camera modules 1210 and 1214 can be used to capture the other three corner areas of the scene area with camera modules 804, 806 and 808 being used for this purpose in one embodiment.

Figure 13:
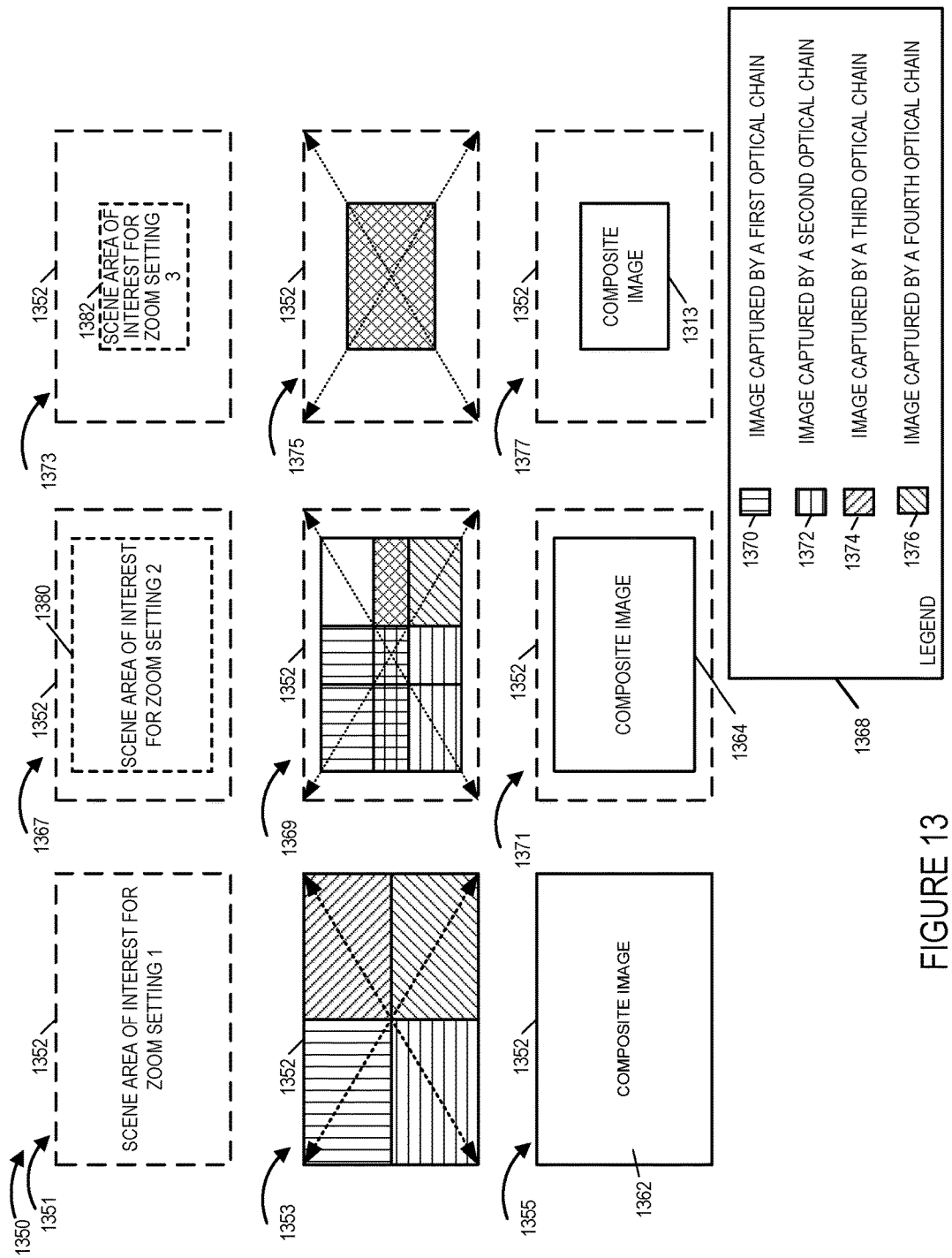
FIG. 13 illustrates exemplary user controlled zoom and exemplary overlap between captured images from different moveable optical chains which are positioned, e.g., adjusted, as a function of a user selected zoom focal length setting, in accordance with an exemplary embodiment.

FIG. 13 illustrates how the overlap of images captured by different camera modules can be changed by moving camera modules used to capture corner portions of a scene area of interest as a function of zoom setting. FIG. 13 including drawing 1350 and legend 1368. Drawing 1350 includes first column drawing 1351, 1353 and 1355, second column drawing 1367, 1369 and 1371 and third column drawings 1373, 1375 and 1377. Legend 1368 indicates that: an image captured by a first optical chain is indicated by vertical line shading, as indicated by legend block 1370; an image captured by a second optical chain is indicated by horizontal line shading, as indicated by legend block 1372, an image captured by a third optical chain is indicated by descending line shading, as indicated by legend block 1374; an image captured by a fourth optical chain is indicated by ascending line shading, as indicated by legend block 1376.

The first column in FIG. 13 is used to represent zoom setting one. The scene area of interest for zoom setting 1 is indicated by area 1352 of drawing 1351. In FIG. 13, zoom setting one is a low or no zoom setting. Little or no overlap occurs between the images captured by the four camera modules used to capture the corner portions of the scene area of interest at zoom setting one as can be seen from the second row of first column of FIG. 13 and image 1353 which shows the overlap, e.g., no overlap, of the images captured by the four corner camera modules of 804, 810, 806 and 808, as indicated by the non-overlapping shading patterns in drawing 1353. While not shown in FIG. 13, module 812 may be used to capture an image corresponding to the center portion of the scene area of interest which may be combined with the images captured by modules 804, 810, 806 and 808. An image captured by module 828 may be used to facilitate the combining. Drawing 1355 shows that the he composite image 1362 is generated from the images of drawing 1353 captured by the different camera modules, and the composite image 1362 corresponds to scene area of interest for zoom setting 1 1352.

The second column of FIG. 13 corresponds to a second, higher, zoom setting. Drawing 1367 identifies that the scene area of interest 1380 for zoom setting 2 is smaller than the scene area of interest 1352 for zoom setting 1. Note that the overlap of the images captured by the corner camera modules increases as shown in drawing 1369, as indicated by shading pattern overlap, due to the camera modules used to capture the corner images being moved as a function of the second zoom setting to increase the overlap in the scene area that is captured. Drawing 1371 illustrates composite image 1364 which is generated for zoom setting 2, based on combining captured images from the multiple camera modules including movable camera modules (804, 810, 806, 808), and in some embodiments further including images captured by one or both of modules 812 and 828, and which corresponds to scene area of interest 1380 for zoom setting 2.

The third column of FIG. 13 corresponds to a third, e.g., highest, zoom setting. Drawing 1373 identifies that the scene area of interest 1382 for zoom setting 3 is smaller than the scene area of interest 1352 for zoom setting 1 and smaller than the scene area of interest 1380 for zoom setting 2. Drawing 1375 shows the overlap that occurs at the third, e.g., highest, zoom setting, as indicated by shading pattern overlap. In such a case the movement of the camera modules is such that all four camera modules 804, 806, 810, 808 capture the same or nearly the same scene portion which also corresponds to the scene portion captured by camera module 812 which may remain fixed as camera modules 804, 806, 810 and 808 are moved as a function of the zoom level setting. As the overlap increases, the cumulative amount of light corresponding to the scene area of interest which can be captured is increased since multiple camera modules are operating in parallel to capture light corresponding to the same scene area. This can improve the quality of the composite image since noise can be averaged and/or the exposure related benefits can be achieved. Drawing 1377 illustrates composite image 1313 which is generated for zoom setting 3, based on combining captured images from the multiple camera modules including movable camera modules (804, 810, 806, 808), and in some embodiments further including images captured by one or both of modules 812 and 828, and which corresponds to scene area of interest 1382 for zoom setting 3.

Figure 14A:
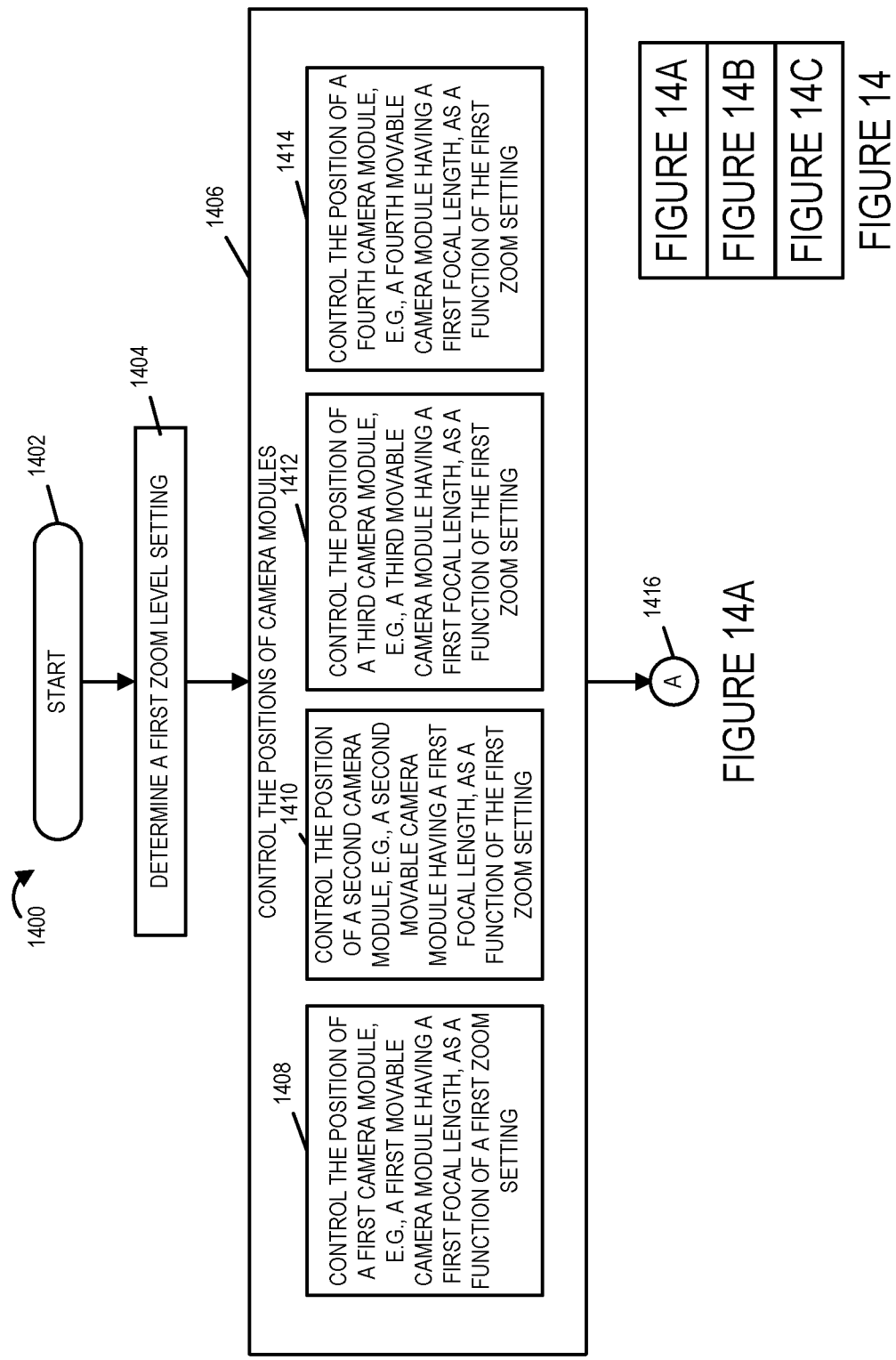
FIG. 14A is a first part of a flowchart of an exemplary method of operating a camera device in accordance with an exemplary embodiment.
Figure 14B:
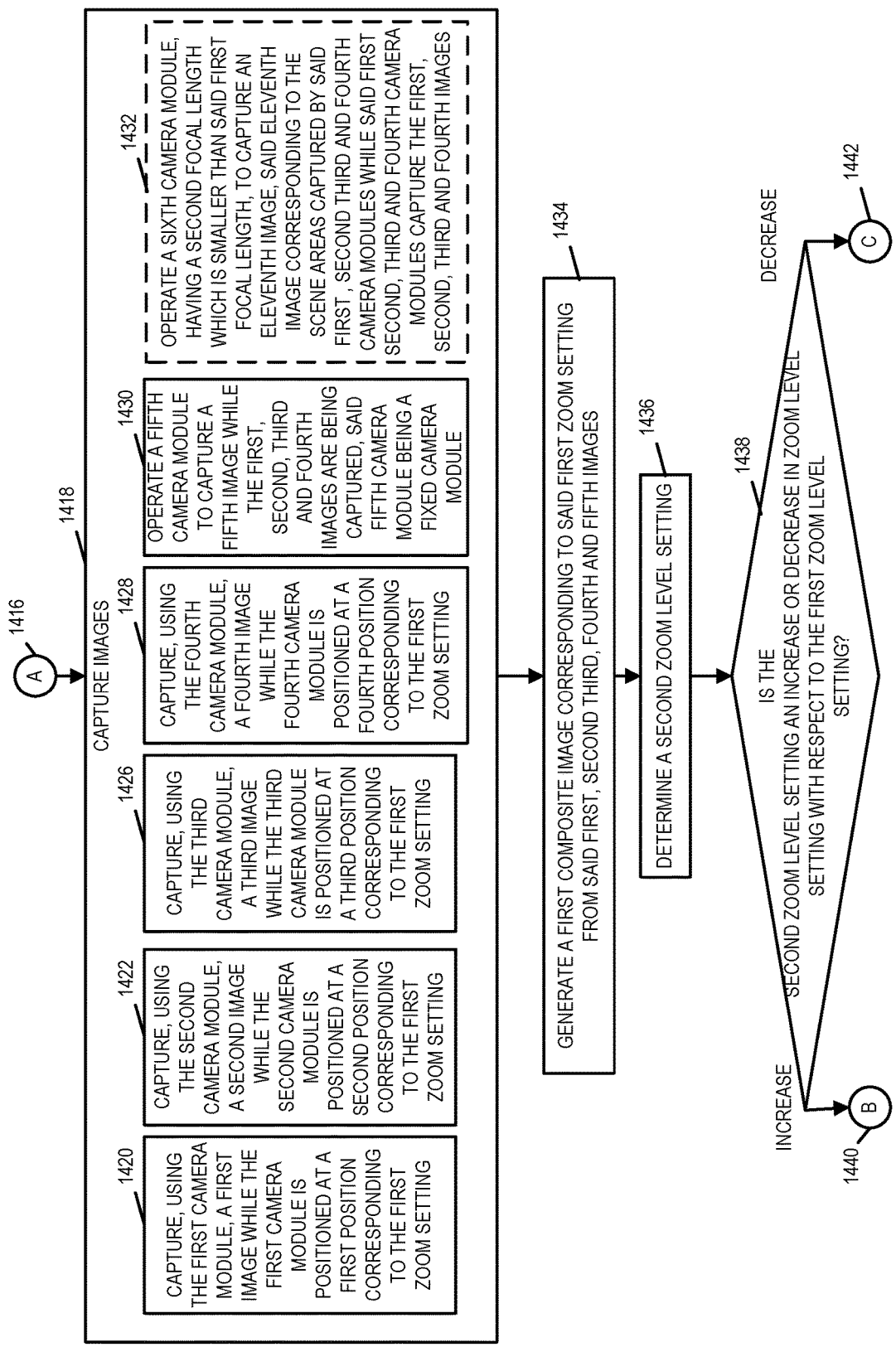
FIG. 14B is a second part of a flowchart of an exemplary method of operating a camera device in accordance with an exemplary embodiment.
Figure 14C:
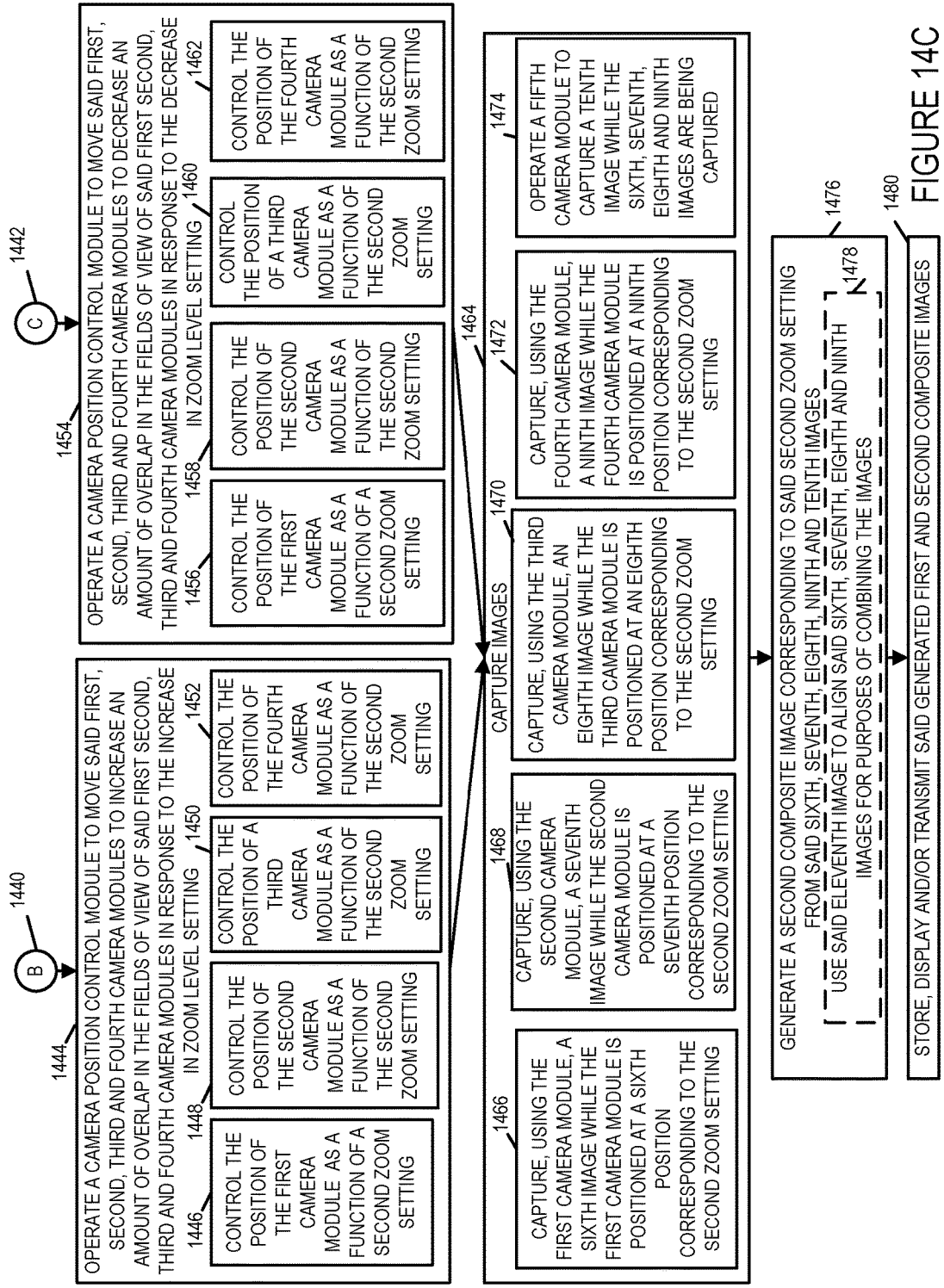
FIG. 14C is a third part of a flowchart of an exemplary method of operating a camera device in accordance with an exemplary embodiment.

At different times different zoom settings may be selected by the user with the position of camera modules, and thus the portion of a scene they capture, varying as a function of the zoom setting FIG. 14, comprising the combination of FIG. 14A, FIG. 14B and FIG. 14C, is a flowchart 1400 of an exemplary method of operating a camera device in accordance with an exemplary embodiment. Operation starts in step 1402 in which the camera device is powered on and initialized. Operation proceeds from step 1402 to step 1404 in which the camera device determines a first zoom level setting of the camera device, e.g., based on a user input or user selection. Operation proceeds from step 1404 to step 1406, in which the camera device controls the postions of camera modules. Step 1406 includes steps 1408, 1410, 1412 and 1414.

In step 1408 the camera device controls the position of a first camera module, a first movable camera module having a first focal length, as a function of the first zoom setting. In step 1410 the camera device controls the position of a second camera module, a second movable camera module having a first focal length, as a function of the first zoom setting. In step 1412 the camera device controls the position of a third camera module, a third movable camera module having a first focal length, as a function of the first zoom setting. In step 1414 the camera device controls the position of a fourth camera module, a fourth movable camera module having a first focal length, as a function of the first zoom setting. Operation proceeds from step 1406, via connecting node A 1416, to set 1418.

In step 1418 the camera device captures images. Step 1418 includes steps 1420, 1422, 126, 1428, and 1430. In some embodiments, step 1418 further includes step 1432. In step 1420 the camera device captures, using the first camera module, a first image while the first camera module is positioned at a first position corresponding to the first zoom setting. In step 1422 the camera device captures, using the second camera module, a second image while the second camera module is positioned at a second position corresponding to the first zoom setting. In step 1426 the camera device captures, using the third camera module, a third image while the third camera module is positioned at a third position corresponding to the first zoom setting. In step 1428 the camera device captures, using the fourth camera module, a fourth image while the fourth camera module is positioned at a fourth position corresponding to the first zoom setting. In step 1430 the camera device operates a fifth camera module to capture a fifth image while the first, second, third and fourth images are being captured, said fifth camera module being a fixed camera module. In some embodiments, said fifth image corresponds to a center portion of a scene area of interest, and said first, second, third and fourth images correspond to first, second, third and fourth scene areas, respectively, that at least partially overlap said center portion of the scene area of interest.

In step 1432 the camera device operates a sixth camera module, having a second focal length which is smaller than said first focal length, to capture an eleventh image corresponding to the scene areas captured by said first, second, third and fourth camera modules while said first, second, third and fourth camera modules capture the first, second third and fourth images. Operation proceeds from step 1418 to step 1434.

In step 1434 the camera device generates a first composite image corresponding to said first zoom setting from said first, second, third, fourth and fifth images. Operation proceeds from step 1434 to step 1436. In step 1436 the camera device determines a second zoom level setting, e.g, based on a detected user selection or user input. Operation proceeds from step 1436 to step 1438.

In step 1438, the camera device determines if the second zoom level setting is an increase or decrease in zoom level setting with respect to the first zoom level setting and controls operation as a function of the determination. If the camera device determines that the second zoom level setting is an increase with respect to the first zoom level setting, then operation proceeds from step 1438, via connecting node B 1440 to step 1444. If the camera device determines that the second zoom level setting is a decrease with respect to the first zoom level setting, then operation proceeds from step 1438, via connecting node C 1442 to step 1454.

In step 1444 a camera position control module is operated to move the first, second, third and fourth camera modules to increase an amount of overlap in the fields of view of said first, second, third and fourth camera modules in response to the increase in zoom level setting. Step 1444 includes steps 1446, 1448, 1450, and 1452. In step 1446, the camera position control module controls the position of the first camera module as a function of the second zoom level setting. In step 1448, the camera position control module controls the position of the second camera module as a function of the second zoom level setting. In step 1450, the camera position control module controls the position of the third camera module as a function of the second zoom level setting. In step 1452, the camera position control module controls the position of the fourth camera module as a function of the second zoom level setting.

In step 1453 a camera position control module is operated to move the first, second, third and fourth camera modules to decrease an amount of overlap in the fields of view of said first, second, third and fourth camera modules in response to the decrease in zoom level setting. Step 1454 includes steps 1456, 1458, 1460, and 1462. In step 1456, the camera position control module controls the position of the first camera module as a function of the second zoom level setting. In step 1458, the camera position control module controls the position of the second camera module as a function of the second zoom level setting. In step 1460, the camera position control module controls the position of the third camera module as a function of the second zoom level setting. In step 1462, the camera position control module controls the position of the fourth camera module as a function of the second zoom level setting.

Operation proceeds from step 1444 or step 1454 to step 1464. In step 1454 the camera device captures images. Step 1464 includes steps 1466, 1468, 1470, 1472 and 1474. In step 1466 the camera device captures, using the first camera module, a sixth image while the first camera module is positioned at a sixth position corresponding to the second zoom level setting. In step 1468 the camera device captures, using the second camera module, a seventh image while the second camera module is positioned at a seventh position corresponding to the second zoom level setting. In step 1470 the camera device captures, using the first camera module, an eighth image while the third camera module is positioned at a sixth position corresponding to the second zoom level setting. In step 1480 the camera device captures, using the fourth camera module, a ninth image while the fourth camera module is positioned at a ninth position corresponding to the second zoom level setting. In step 1474 the camera device operates a fifth camera module to capture a tenth image, while the sixth, seventh, eighth and ninth images are being captured. In some embodiments, said tenth image corresponds to the center portion of a scene area of interest corresponding to said second zoom setting, and said sixth, seventh, eight and ninth images correspond to sixth, seventh, eight and ninth scene areas, respectively, that at least partially overlap said center portion of the scene area of interest corresponding to the second zoom setting. Operation proceeds from step 1464 to step 1476.

In step 1476 the camera device generates a second composite image corresponding to said second zoom setting from said sixth, seventh, eighth, ninth and tenth images. In some embodiments, step 1476 includes step 1478. In step 1478 the camera device uses said eleventh image to align said sixth, seventh, eight, ninth images for the purpose of combining the images.

Operation proceeds from step 1476 to step 1480. In step 1480 the camera device stores, displays and/or transmits the generated first and second composite images.

In one exemplary embodiment, the camera device implementing the method of flowchart 1400 is camera device 802 of FIG. 8, the first camera module is movable camera module 804, the second camera module is movable camera module 806, the third camera module is movable camera module 810, the fourth camera module is movable camera module 808, the fifth camera module is fixed camera module 812, and the sixth camera module is camera module 828.

In one embodiment, a method of operating a camera device including multiple camera modules includes: controlling the position of a first camera module as a function of a first zoom setting; and capturing, using the first camera module, a first image while the first camera module is positioned at a first position corresponding to the first zoom setting. The exemplary method further includes, in some embodiments, controlling the position of a second camera module as a function of the first zoom setting; and capturing, using the second camera module, a second image while the second camera module is positioned at a second position corresponding to the first zoom setting. The method sometimes further includes controlling the position of a third camera module as a function of the first zoom setting; capturing, using the third camera module, a third image while the third camera module is positioned at a third position corresponding to the first zoom setting; controlling the position of a fourth camera module as a function of the first zoom setting; and capturing, using the fourth camera module, a fourth image while the fourth camera module is positioned at a fourth position corresponding to the first zoom setting. The first, second, third and fourth camera modules are moveable camera modules in some embodiments with, the method further comprising operating a fifth camera module to capture a fifth image, said fifth image being captured while said first, second, third and fourth images are being captured, said fifth camera module being a fixed camera module. In some embodiment the fifth image corresponds to a center portion of a scene area of interest and wherein said first, second, third and fourth images correspond to first, second, third and fourth scene areas, respectively, that at least partially overlap said center portion of the scene area of interest. The method may, and sometime does further include generating a first composite image corresponding to said first zoom setting from said first, second, third, fourth and fifth images.

The exemplary method may be used with multiple user selected zoom setting with different zoom settings being used at different times. The exemplary method may, and sometimes also does further include controlling the position of the first camera module as a function of a second zoom setting; and capturing, using the first camera module, a sixth image while the first camera module is positioned at a sixth position corresponding to the second zoom setting, controlling the position of the second camera module as a function of the second zoom setting; and capturing, using the second camera module, a seventh image while the second camera module is positioned at a seventh position corresponding to the second zoom setting. The method may and sometimes does also include controlling the position of the third camera module as a function of the second zoom setting; capturing, using the third camera module, an eight image while the third camera module is positioned at an eight position corresponding to the second zoom setting; controlling the position of the fourth camera module as a function of the second zoom setting; and capturing, using the fourth camera module, a ninth image while the fourth camera module is positioned at a ninth position corresponding to the first zoom setting. The method may and also sometimes does include operating the fifth camera module to capture a tenth image, said tenth image being captured while said sixth, seventh, eight and ninth images are being captured.

In some embodiments the tenth image corresponds to the center portion of a scene area of interest corresponding to said second zoom setting and wherein said sixth, seventh, eight and ninth images correspond to sixth, seventh, eight and ninth scene areas, respectively, that at least partially overlap said center portion of the scene area of interest corresponding to the second zoom setting and the method further includes generating a second composite image corresponding to said second zoom setting from said sixth, seventh, eighth, ninth and tenth images.

In some embodiments the first, second, third and fourth camera modules have a first focal length, the camera device including a sixth camera module having a second focal length which is smaller than said first focal length, the method comprising: operating the sixth camera module to capture an eleventh image, said eleventh corresponding to the scene areas captured by said first, second, third and fourth camera modules while said first, second, third and fourth camera modules capture said first, second, third and fourth images; and wherein generating the second composite image includes using said eleventh image to align said sixth, seventh, eight and ninth images for purposes of combining the images.

The exemplary method may and sometimes does further include operating a camera module position control module to move said first, second, third and fourth camera modules to increase the amount of overlap in the fields of view of said first, second, third and fourth camera modules in response to an increase in a zoom level setting and operating the camera module position control module to move said first, second, third and fourth camera modules to decrease the amount of overlap in the fields of view of said first, second, third and fourth camera modules in response to a decrease in the zoom level setting.

Methods and apparatus which use multiple optical chains to capture multiple images of an area at the same time are described. In various embodiment at least some of the optical chains are moveable, e.g., rotatable. The multiple captured images may, and in some embodiments are then combined to form a combined image. The combined image in various embodiments is normally of higher quality than would be achieved using just a single one of the optical chains.

Various embodiments, provide many of the benefits associated with use of a large lens and/or large high quality sensor, through the use of multiple optical chains which can normally be implemented using smaller and/or lower cost components than commonly used with a high quality large lens single optical chain camera implementation.

In various embodiments an optical chain, e.g., camera module, includes a combination of elements including one or more lenses, and a sensor. Many of the optical chains used in an exemplary camera are moveable, e.g., rotatable, to allow the angle and thus direction in which the optical chains are pointing to be changed by controlling the angle of rotation of the optical chain.

In at least some embodiments images captured by different optical chains are combined. In some embodiments the images from two, three or more, e.g., six or more, optical chains are combined to form a single combined image. While images from optical chains with different orientations are combined in some embodiments, it should be appreciated that images captured by more than one optical chain with the same orientation can be combined with one or more images captured by optical chains with a different orientation, e.g., relative to the bottom of the camera, e.g., the horizontal, for purposes of explanation. Thus, by combining images from different optical chains many advantages can be achieved allowing for multiple small lenses to be used as compared to systems using a single large round lens.

In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

Different optical chain modules maybe and sometimes are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

In some embodiments the camera device is implemented with camera modules that do not include a mirror or combination of light redirection device for directing light at a 90 degree angle or a nearly 90 degree angle. In some such embodiments the camera modules are generally straight and face forward with the sensor being located near the back of the camera device. Numerous additional embodiments are possible while staying within the scope of the above discussed features.

What is claimed is:

1. A method of operating a camera device, the method comprising:
   controlling the position of a first camera module of said camera device as a function of a first zoom setting;
   capturing, using the first camera module, a first image of a first scene area at a first resolution while the first camera module is positioned at a first position corresponding to the first zoom setting;
   controlling the position of a second camera module of said camera device as a function of the first zoom setting;
   capturing, using the second camera module, a second image of a second scene area at the first resolution while the second camera module is positioned at a second position corresponding to the first zoom setting;
   controlling the position of a third camera module of said camera device as a function of the first zoom setting;
   capturing, using the third camera module, a third image of a third scene area at the first resolution while the third camera module is at a third position corresponding to the first zoom setting; and
   capturing using an additional camera module of said camera device an additional image while said first camera module captures said first image, said additional camera module having a smaller focal length than said first and second camera modules and capturing at least a portion of said first scene area and a portion of said second scene area at a second lower resolution which is lower than said first resolution.

2. A method of operating a camera device, the method comprising:
   controlling the position of a first camera module of said camera device as a function of a first zoom setting; and
   capturing, using the first camera module, a first image while the first camera module is positioned at a first position corresponding to the first zoom setting; and
   controlling the position of a second camera module of said camera device as a function of the first zoom setting;
   capturing, using the second camera module, a second image while the second camera module is positioned at a second position corresponding to the first zoom setting;
   controlling the position of a third camera module of said camera device as a function of the first zoom setting;
   capturing, using the third camera module, a third image while the third camera module is positioned at a third position corresponding to the first zoom setting;
   controlling the position of a fourth camera module of said camera device as a function of the first zoom setting; and
   capturing, using the fourth camera module, a fourth image while the fourth camera module is positioned at a fourth position corresponding to the first zoom setting;
   capturing using an additional camera module of said camera device an additional image while said first camera module captures said first image, said additional camera module having a smaller focal length than said first camera module; and
   wherein said additional camera module has a smaller focal length than the first and second camera modules and wherein said additional image includes a scene area captured by the combination of the first, second, third and fourth camera modules.

3. The method of claim 2, further comprising:
   generating a first composite image by combining said first, second, third and fourth images, said step of generating the first composite image including using said additional image to align said first, second, third and fourth images for purposes of combining the first, second, third and fourth images.

4. A method of operating a camera device, the method comprising:
   controlling the position of a first camera module of said camera device as a function of a first zoom setting; and
   capturing, using the first camera module, a first image while the first camera module is positioned at a first position corresponding to the first zoom setting;
   controlling the position of a second camera module of said camera device as a function of the first zoom setting;
   capturing, using the second camera module, a second image while the second camera module is positioned at a second position corresponding to the first zoom setting;
   capturing using an additional camera module of said camera device an additional image while said first camera module captures said first image;
   controlling the position of a third camera module of said camera device as a function of the first zoom setting;
   capturing, using the third camera module, a third image while the third camera module is positioned at a third position corresponding to the first zoom setting;
   controlling the position of a fourth camera module of said camera device as a function of the first zoom setting; and
   capturing, using the fourth camera module, a fourth image while the fourth camera module is positioned at a fourth position corresponding to the first zoom setting; and wherein said first, second, third and fourth camera modules are moveable camera modules and wherein the additional camera module has a focal length which is the same as the focal length of the first, second, third, and fourth camera modules and wherein said additional camera module captures a center portion of a scene area of interest.

5. The method of claim 4, wherein said first, second, third and fourth images correspond to first, second, third and fourth scene areas, respectively, that at least partially overlap said center portion of the scene area of interest.

6. The method of claim 4, further comprising:
generating a first composite image corresponding to said first zoom setting from said first, second, third, fourth images and said additional image.

7. The method of claim 6, further comprising:
controlling the position of the first camera module as a function of a second zoom setting; and
capturing, using the first camera module, a sixth image while the first camera module is positioned at a sixth position corresponding to the second zoom setting.

8. The method of claim 7, further comprising:
controlling the position of the second camera module as a function of the second zoom setting; and
capturing, using the second camera module, a seventh image while the second camera module is positioned at a seventh position corresponding to the second zoom setting.

9. The method of claim 8, further comprising:
controlling the position of the third camera module as a function of the second zoom setting;
capturing, using the third camera module, an eight image while the third camera module is positioned at an eighth position corresponding to the second zoom setting;
controlling the position of the fourth camera module as a function of the second zoom setting; and
capturing, using the fourth camera module, a ninth image while the fourth camera module is positioned at a ninth position corresponding to the second zoom setting.

10. The method of claim 9, further comprising:
operating the additional camera module to capture a tenth image, said tenth image being captured while said sixth, seventh, eighth and ninth images are being captured; and
wherein said tenth image corresponds to the center portion of a scene area of interest corresponding to said second zoom setting and wherein said sixth, seventh, eighth and ninth images correspond to sixth, seventh, eighth and ninth scene areas, respectively, that at least partially overlap said center portion of the scene area of interest corresponding to the second zoom setting.

11. The method of claim 10, further comprising:
generating a second composite image corresponding to said second zoom setting from said sixth, seventh, eighth, ninth and tenth images.

12. The method of claim 2, further comprising:
operating a camera module position control module to move said first, second, third, and fourth camera modules to increase the amount of overlap in the fields of view of said first, second, third and fourth camera modules in response to an increase in a zoom level setting; and
operating the camera module position control module to move said first, second, third, and fourth camera modules to decrease the amount of overlap in the fields of view of said first, second, third and fourth camera modules in response to a decrease in the zoom level setting.

13. A camera device comprising:
a first moveable camera module having a first focal length;
a second moveable camera module having the first focal length;
a third moveable camera module;
an additional camera module having a smaller focal length than said first and second moveable camera modules;
a zoom controller for controlling zoom operations, the position of the first moveable camera module being controlled as a function of a zoom setting; and
a processor configured to:
control the first camera module to capture a first image of a first scene area at a first resolution while the first camera module is positioned at a first position corresponding to the first zoom setting;
control the second camera module to capture a second image of a second scene area at the first resolution while the second camera module is positioned at a second position corresponding to the first zoom setting;
control the third camera module to capture a third image of a third scene area while the third camera module is positioned at a third position corresponding to the first zoom setting; and
control the additional camera module to capture an additional image while said first camera module captures said first image, said additional camera module having a smaller focal length than said first and second camera modules and capturing at least a portion of said first scene area and a portion of said second scene area at a second lower resolution which is lower than said first resolution.

14. The camera device of claim 13, wherein said additional camera module captures an image area a portion of which is captured by each of said first, second, third and fourth moveable camera modules.

15. A camera device comprising:
a first moveable camera module;
a second moveable camera module;
a third moveable camera module;
a fourth moveable camera module;
a first additional camera module; and
a zoom controller for controlling zoom operations, the zoom controller controlling: a position of the first moveable camera module, a position of the second moveable camera module, a position of the third moveable camera module, and a position of the fourth moveable camera module as a function of a zoom setting; and
wherein said additional camera module has the same focal length as said first, second, third and fourth moveable camera modules, the first additional camera module capturing a center portion of a scene area which is at least partially captured by said first, second, third and fourth moveable camera modules.

* * * * *